Patented June 2, 1953

2,640,862

UNITED STATES PATENT OFFICE 2,640,862

BATTERY PIGMENT

Melvin F. Chubb, Joplin, Mo., assignor to The Eagle-Picher Company, Cincinnati, Ohio, a corporation of Ohio No Drawing. Application August 10, 1949, Serial No. 109,611

6 Claims. (Cl. 136—67)

This invention relates to a lead pigment adapted to be used in storage batteries of the lead-acid type. Such batteries are fabricated by making a paste of a lead pigment, such as litharge or red lead or a blend thereof, with a liquid, such as water or an electrolyte. This paste is then applied to the lead grids which are intended to hold the lead pigment in contact with the electrolyte within the storage battery. After pasting, the plates are permitted to dry or are purposefully dried, which changes the paste to a brittle solid which is apt to crack or draw away from the grid during storage or handling operations prior to incorporation of the plate in the storage battery. The present invention is directed to a battery pigment which is less apt to separate from the grid after pasting and before use in the battery. The invention is also directed to a method of stabilizing storage battery plates during the period indicated, or of increasing the adhesion of dried paste to grids.

In the past, it has been proposed to incorporate all manner of filler and fiber in battery pigments and although many have been used with varying degrees of efficacy and success, the problem has persisted and each proposed solution been found to be less than fully satisfactory.

I have found that adhesion of the dried paste to the grid can be had by mixing with the dry battery pigment a fiber of particular type which is defined by the physical rather than the chemical properties of the fiber, although the latter must not be such as to impede the normal electrolytic actions within the battery.

The fibers which I propose to use are cut fibers, that is, synthetic textile fibers of predetermined length, characterized by smooth exteriors and exhibiting little tendency to felt or mat. Most natural fibers have this tendency to felt or mat or ball up in the mixing because of their kinky nature or the capacity of the fiber ends for interengagement. Cut synthetic fibers, on the other hand, are relatively straight and smooth and are devoid of end filaments which have the tendency to intertwine. Further, the length of cut fibers can be controlled to provide a uniform length of a predetermined denier, whereas natural fibers must be accepted as constituted by nature.

My cut fibers may be fabricated by cutting a viscose rayon strand having a denier of from 1.5–5.5 into individual fibers having a length of from 1/8–1 inch. Such fibers may be used in quantity such as .01 per cent to .10 per cent on a weight basis. I prefer to use a fiber of substantially 1.5 denier having a length of substantially 1/2 inch, although the range from 1/4–1/2 inch has been used. Such fiber is preferably used in the quantity of .04 per cent, on the weight basis.

Viscose rayon is readily hydrolyzed by the electrolyte of the storage battery, but it has performed its most useful function during the fabrication of the plate and its storage handling and incorporation in the battery, so that its destruction by the electrolyte does no harm. Its disappearance by hydrolysis does not create voids which weaken the plate, and if anything, the plate is superior in that it is more readily permeated by electrolyte.

Instead of viscose rayon, I may use a fiber of like physical conformation and proportions which is constituted by other synthetic materials, such as vinyl polymers. The acetate component of such polymer does not decompose to release acetic acid from presence of electrolyte. On the other hand, I avoid the use of cellulose acetate because it does decompose to release acetic acid in the presence of the electrolyte, and acetic acid is undesirable in storage batteries.

Having described my invention I desire to be limited only by the following claims:

1. A lead pigment suitable for use in a storage battery of the lead-acid type, said pigment comprising substantially .04 per cent by weight of viscose rayon fibers of substantially 1.5 denier, having a length of substantially 1/2 inch.

2. A lead pigment suitable for use in a storage battery of the lead-acid type, said pigment containing from substantially .01% to .1% by weight of viscose rayon fibers, between substantially 1.5 and 5.5 denier and having a length of between substantially 1/8 inch to 1 inch.

3. A lead pigment suitable for use in a storage battery of the lead-acid type, said pigment comprising substantially .04 per cent by weight of fibers of the class consisting of viscose rayon and vinyl polymer, of substantially 1.5 denier, having a length of substantially 1/2 inch.

4. A lead pigment suitable for use in a storage battery of the lead-acid type, said pigment containing from substantially .01% to .1% by weight of fibers of the class consisting of viscose rayon and vinyl polymer, between substantially 1.5 and 5.5 denier and having a length of between substantially 1/8 inch to 1 inch.

5. A lead pigment suitable for use in a storage battery of the lead-acid type, said pigment comprising substantially .04 per cent by weight of vinyl polymer fibers of substantially 1.5 denier, having a length of substantially ½ inch.

6. A lead pigment suitable for use in a storage battery of the lead-acid type, said pigment containing from substantially .01% to .1% by weight of vinyl polymer fibers, between substantially 1.5 and 5.5 denier and having a length of between substantially ⅛ inch to 1 inch.

MELVIN F. CHUBB.

References Cited in the file of this patent

UNITED STATES PATENTS

| Number | Name | Date |
|---|---|---|
| 493,817 | Bristol | Mar. 21, 1893 |
| 1,051,261 | Ricks | Jan. 21, 1913 |
| 2,233,281 | Brown et al. | Feb. 25, 1941 |
| 2,344,614 | Hulse | Mar. 21, 1944 |